Sept. 11, 1934.  W. M. EMERY  1,973,052
MANGLE
Filed Feb. 11, 1930  9 Sheets-Sheet 1
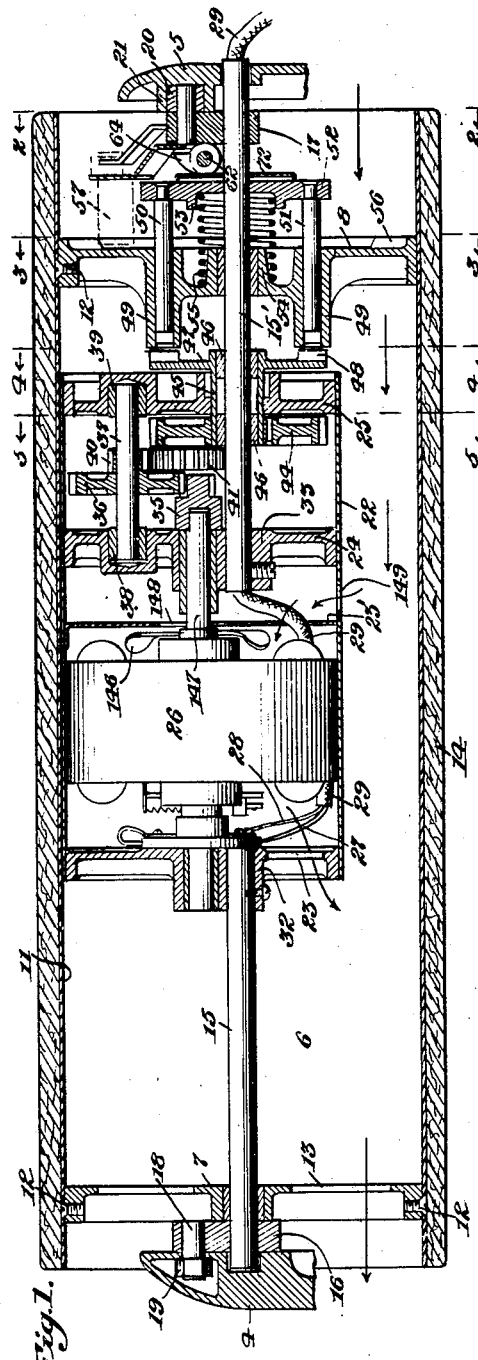
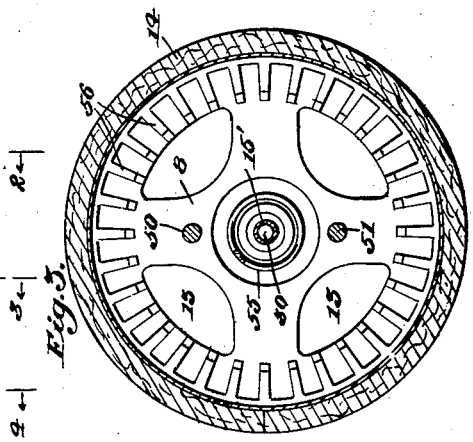
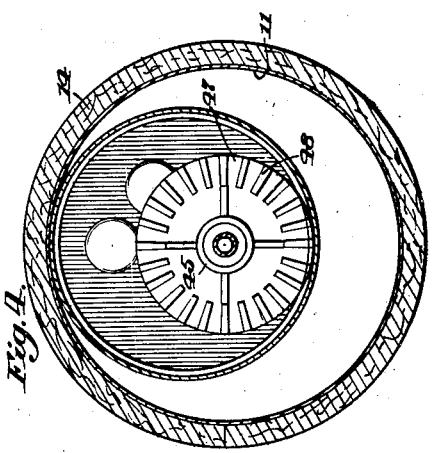
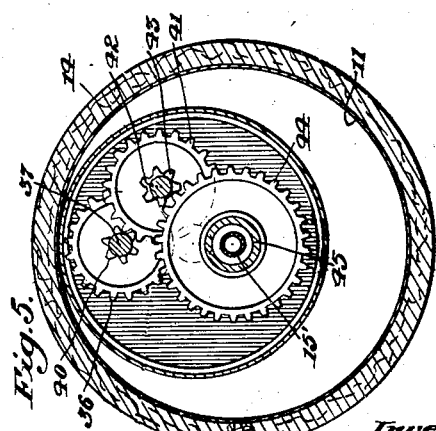
Inventor:
William M. Emery,
by
Atty.

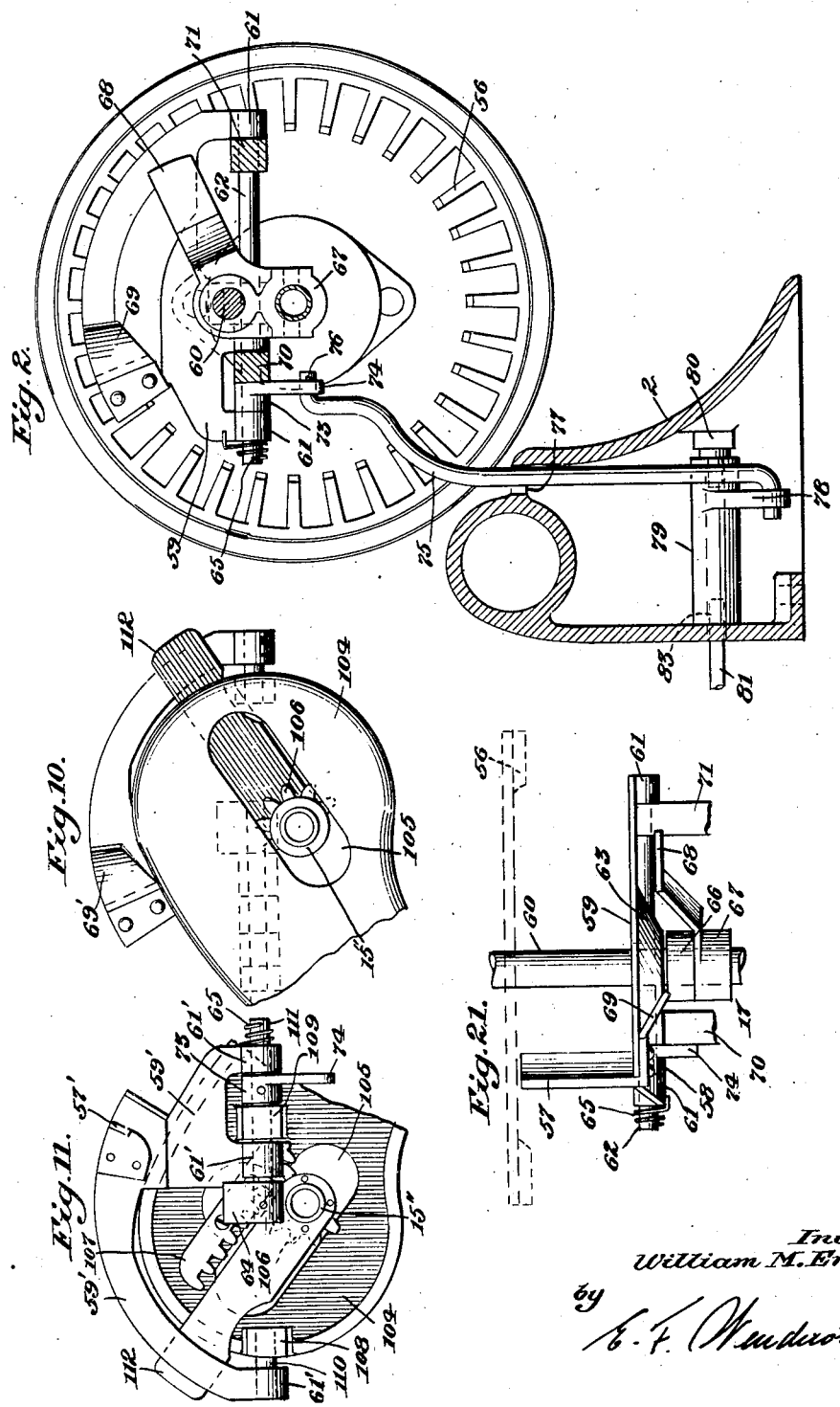

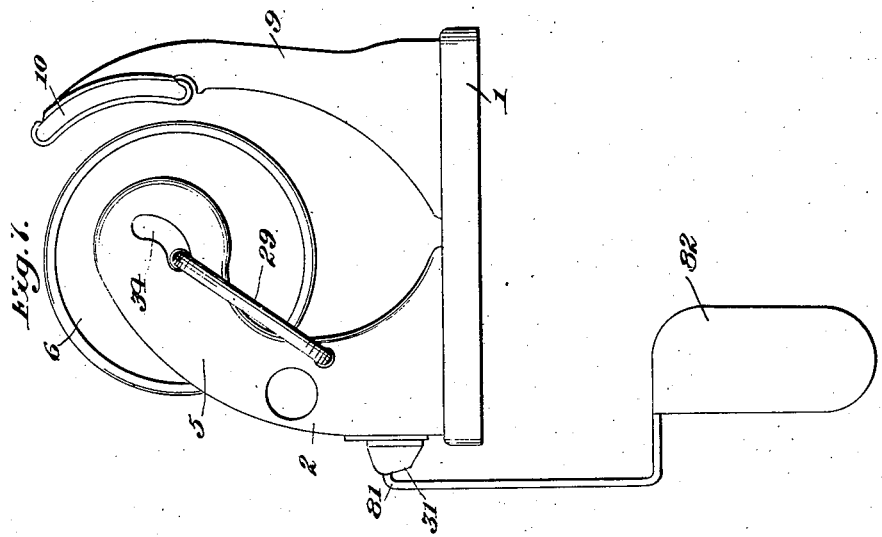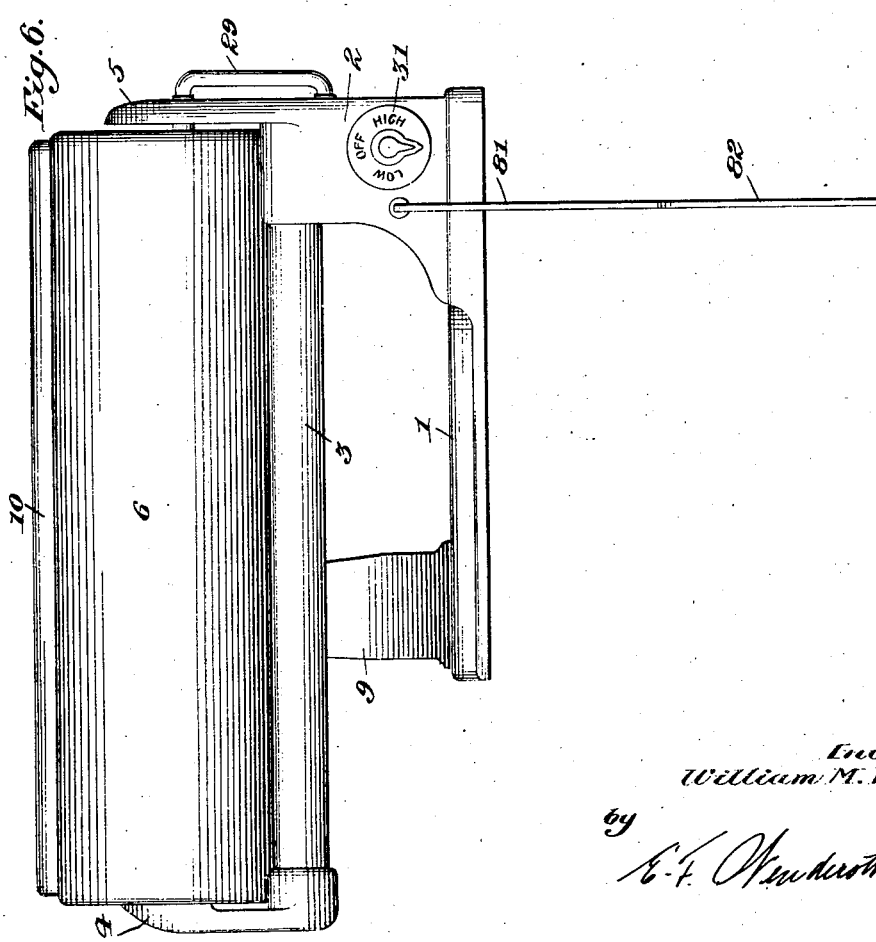

Sept. 11, 1934.  W. M. EMERY  1,973,052
MANGLE
Filed Feb. 11, 1930  9 Sheets-Sheet 4
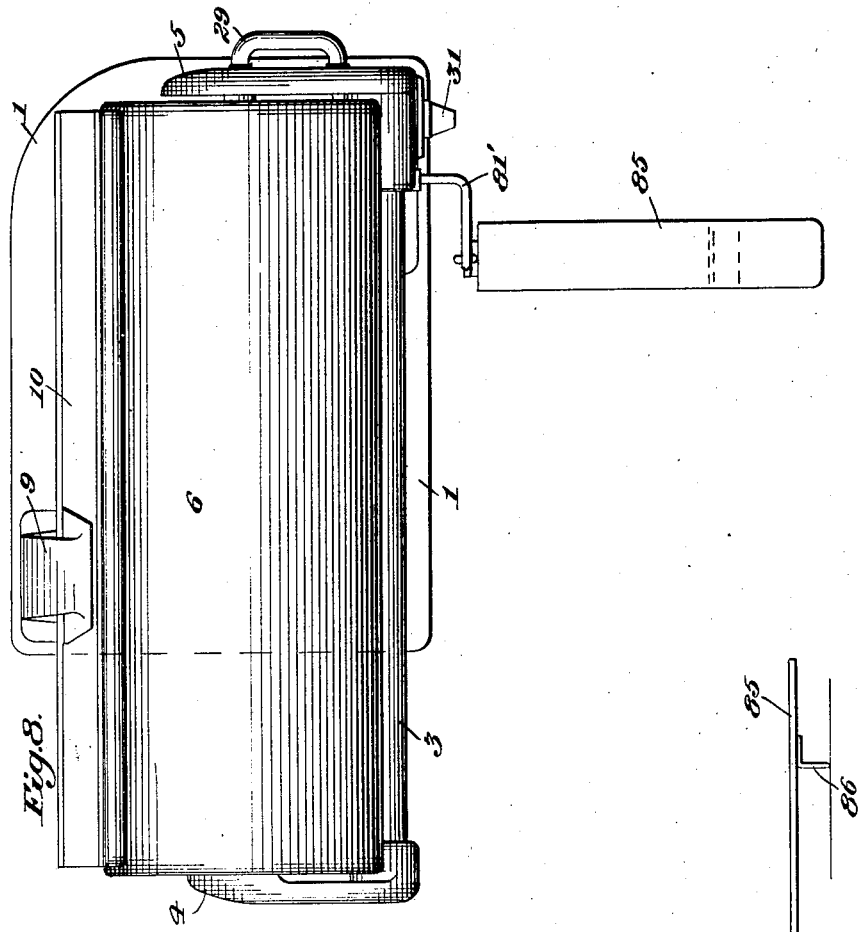
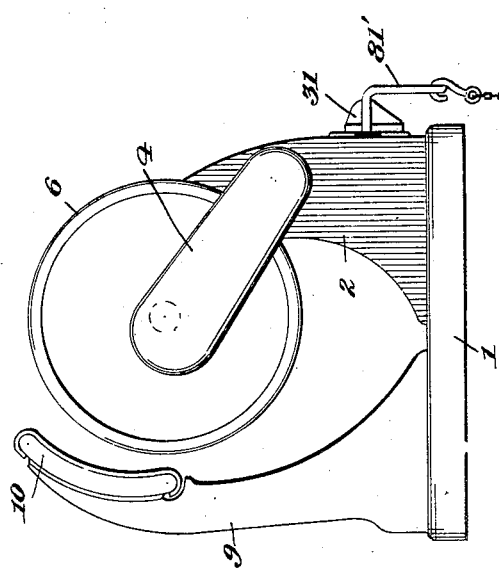
Inventor:
William M. Emery,
by
Atty.

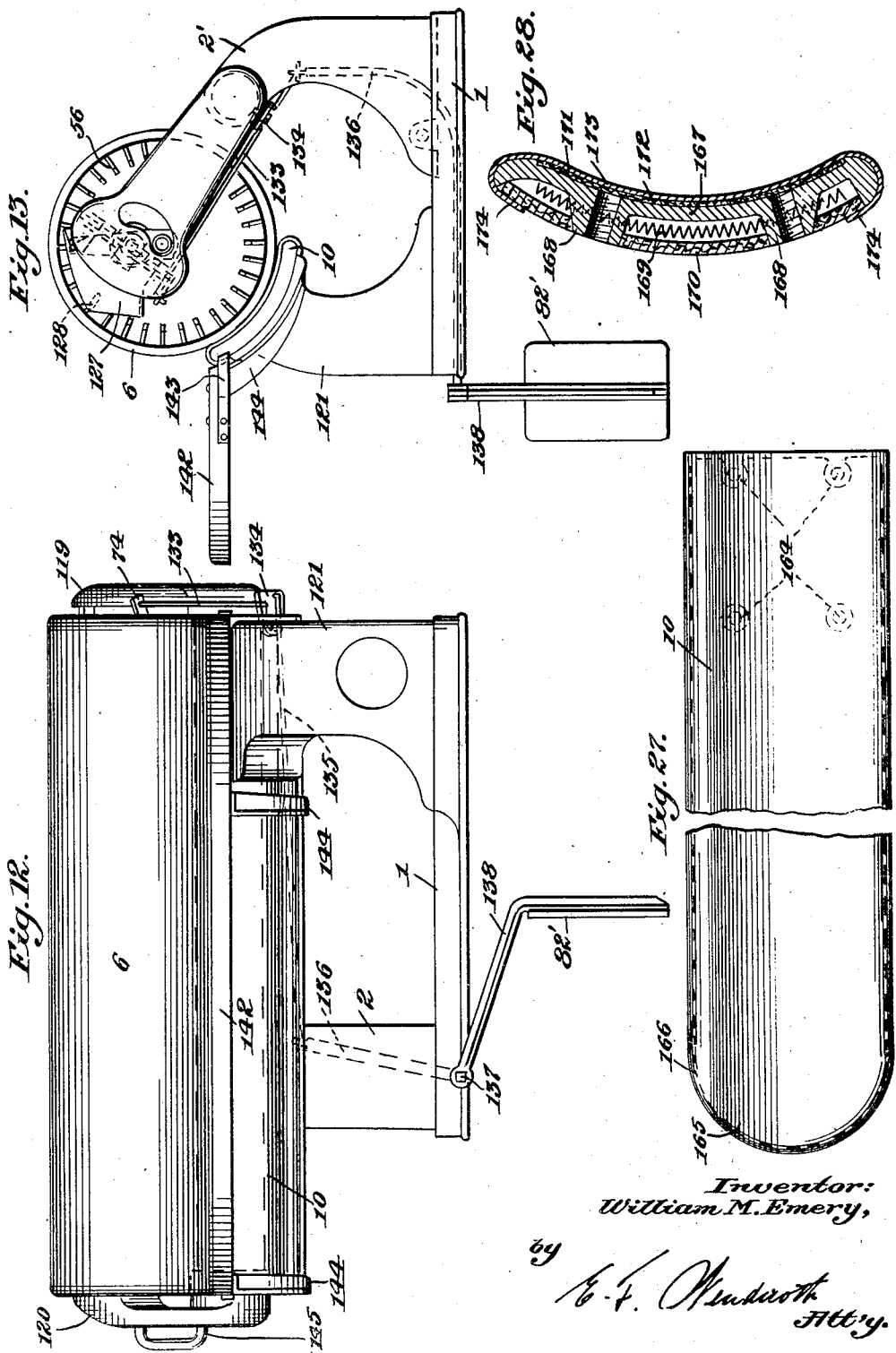

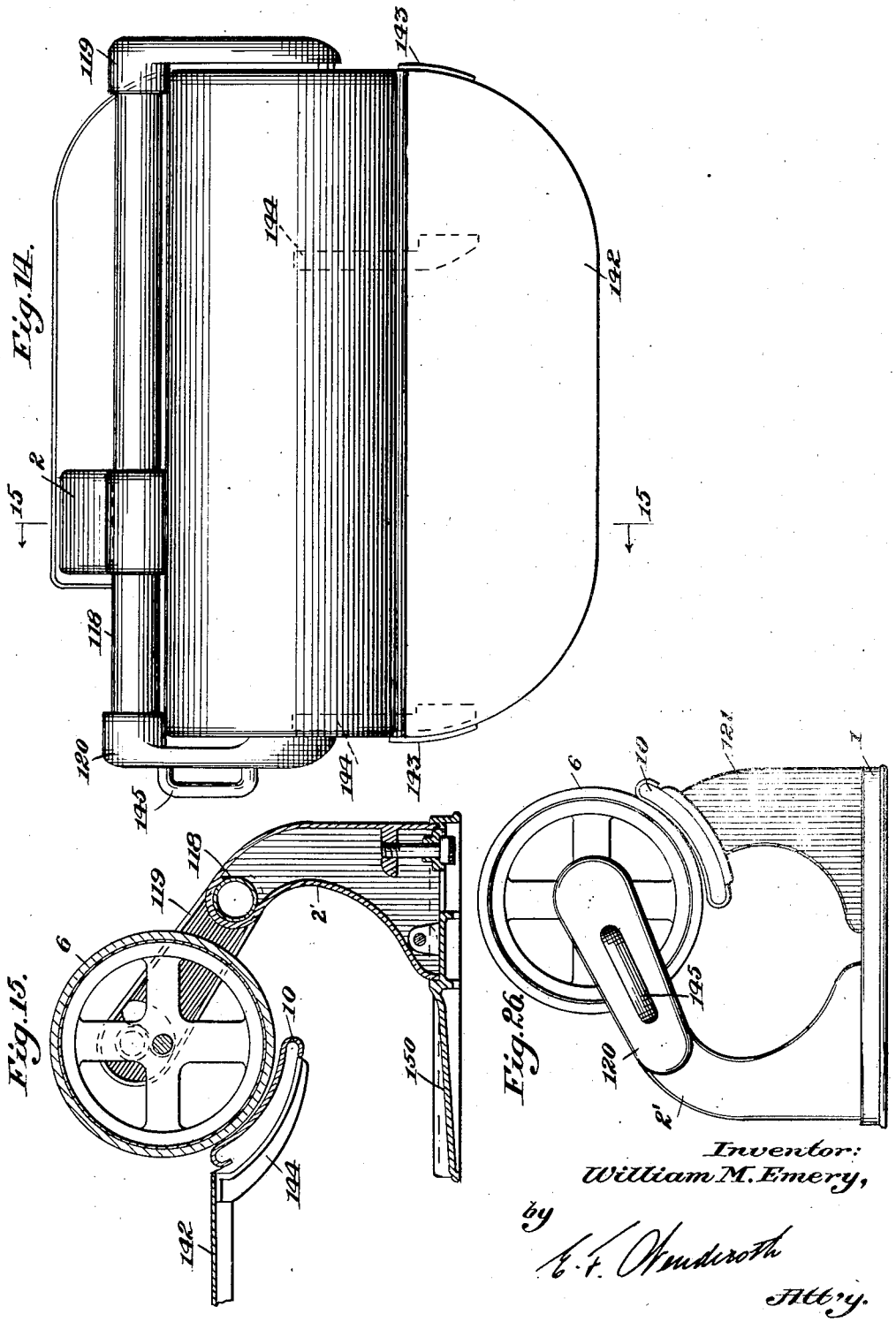

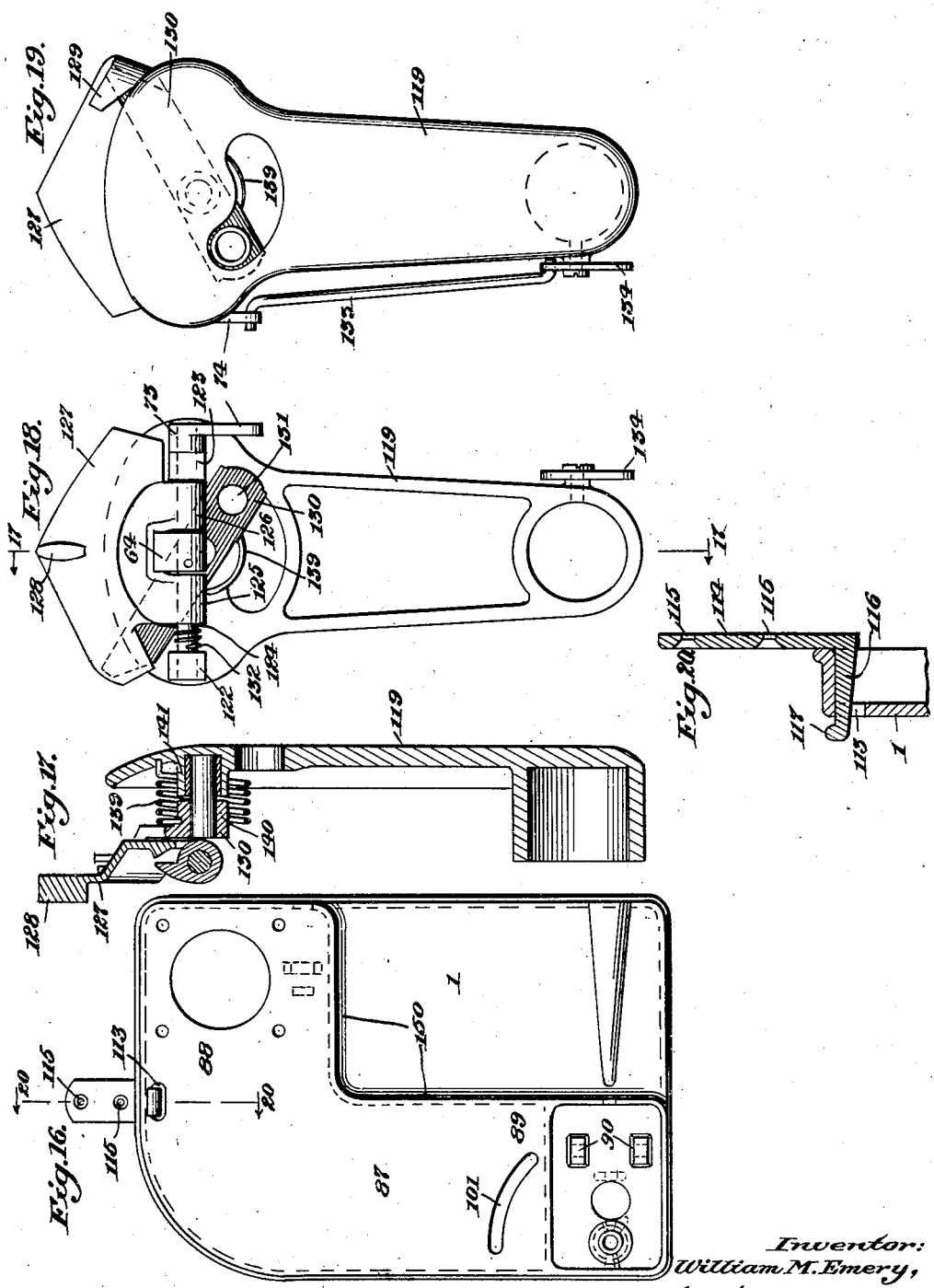

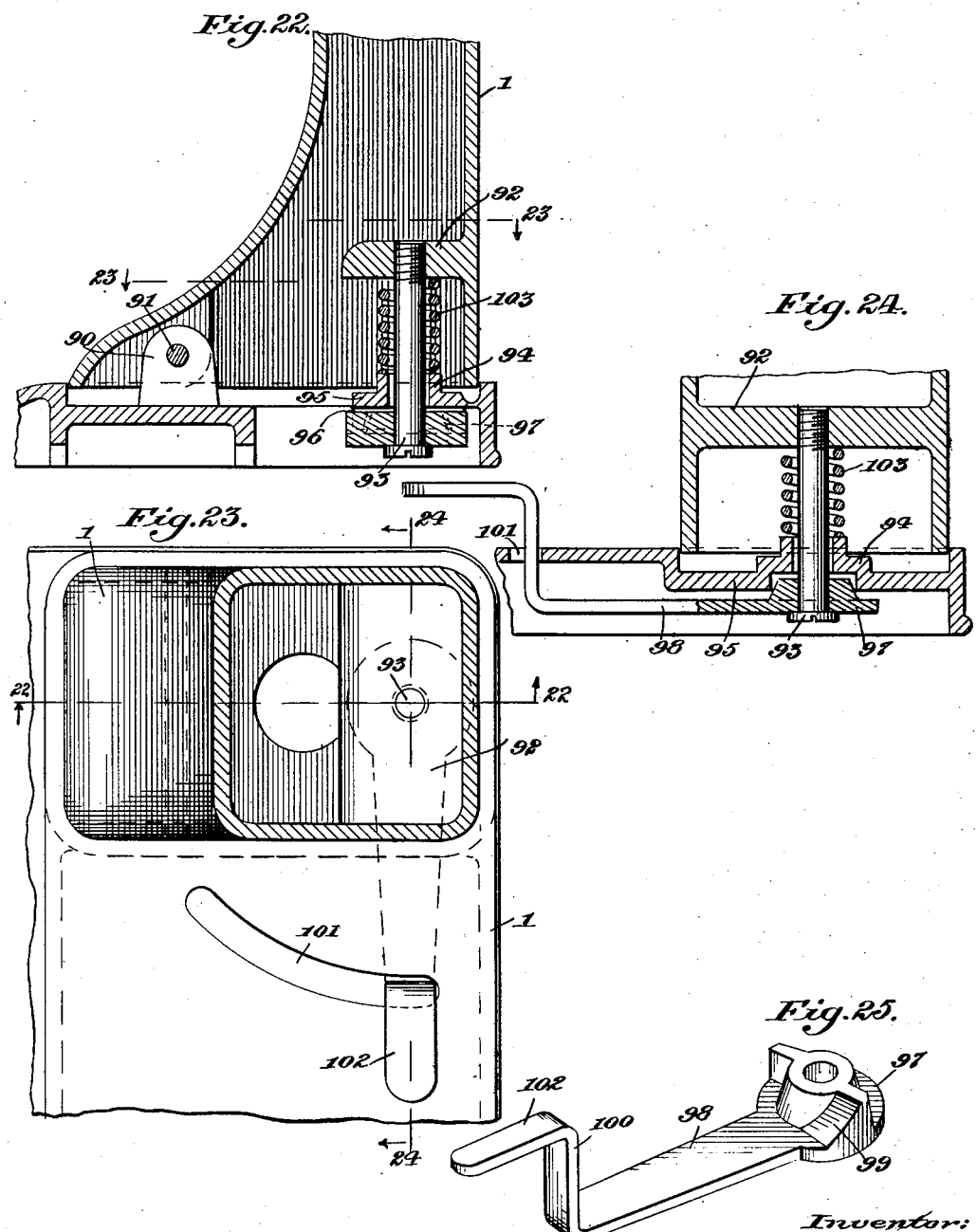

Sept. 11, 1934.  W. M. EMERY  1,973,052
MANGLE
Filed Feb. 11, 1930   9 Sheets-Sheet 9
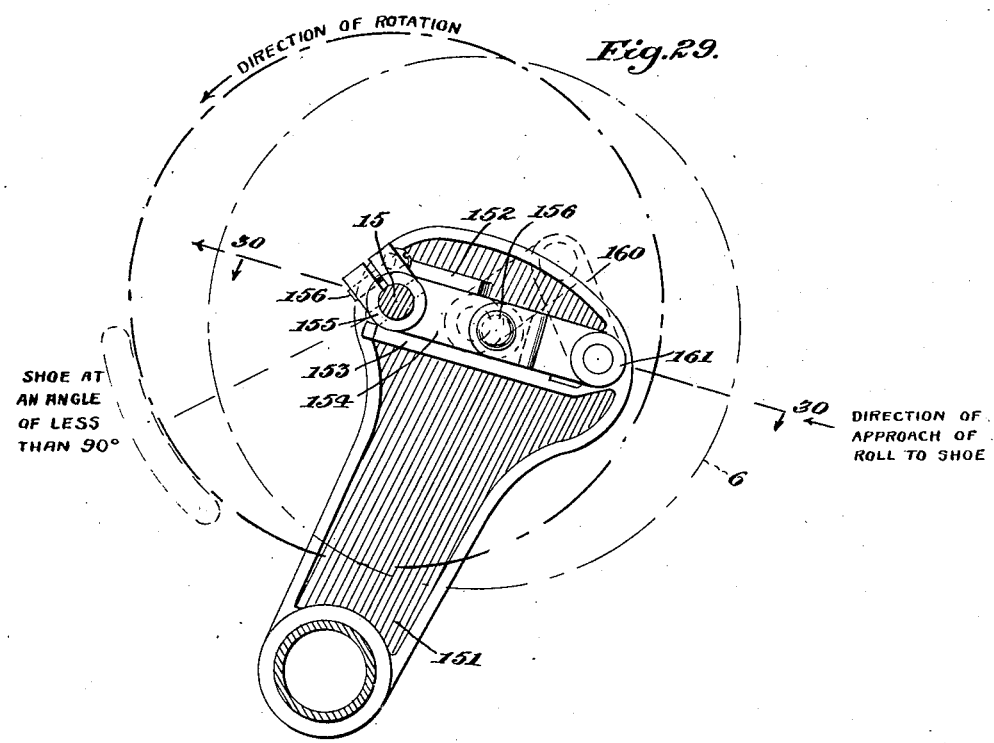
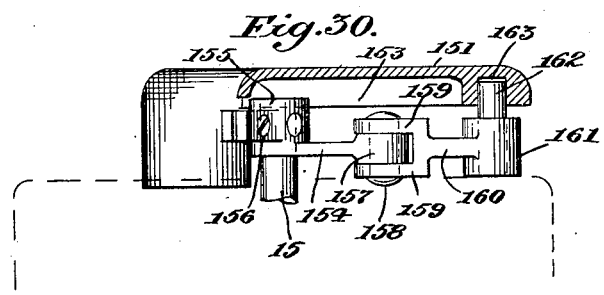

Patented Sept. 11, 1934

1,973,052

UNITED STATES PATENT OFFICE

1,973,052

MANGLE

William M. Emery, Lansdowne, Pa., assignor to Westinghouse Electric & Manufacturing Company, a corporation of Pennsylvania Application February 11, 1930; Serial No. 427,603

17 Claims. (Cl. 68—9)

This invention is directed towards an ironing machine of the type known as a mangle, and is more particularly concerned with that type of ironing machine or mangle which is adapted for use in the average small home. The invention is characterized by its lightness, efficiency, economy of production, ease in handling, and by the novel arrangement of its several elements.

With the foregoing in mind, and from an inspection of the accompanying drawings, it will be seen that an object of my invention is to produce a new and improved type of ironing machine having an "underfeed" or an "overfeed" and utilizing a standardized inner roll mechanism with either type.

Another object is to produce an ironer having combination or interchangeable foot and knee controls.

Another object is to produce an ironer capable of ironing the sleeves of garments single thickness, without folding or creasing by locating the sleeve over the shoe of the ironer.

Another object is to produce an ironer having means for actuating the motor in such manner as to cause it to move the roll toward the shoe and to supply the pressure which is applied between the roll and the shoe.

Another object is to increase the clearance underneath the forward member (the shoe in the case of the under-feed type of ironer, and the roll in the over-feed type).

Another object is to produce an ironer in which the average relative distance between the shoe and the roll can be adjusted at will to regulate the point in the cycle of movement at which the roll will engage its shoe, and in which the shoe is resiliently mounted in order that all thicknesses of materials to be ironed may be accommodated.

Another object is to provide an ironer having a roll and a shoe, characterized by the inclusion of means operable at will to definitely increase the spacing between the roll and the shoe, in order to prevent scorching of the roll during cooling thereof.

Still another object is to produce an ironer having a roll and a shoe, and a knuckle joint for moving one member relative to the other in a substantially rectilinear direction.

Another object is to produce an ironer having a motor and gear housing formed substantially of a cylindrical tube arranged interiorly of the ironing roll, and having transverse partition plates in which the motor and gearing elements are mounted and in which the motor is continuously and efficiently ventilated.

Another object is to produce an ironer comprising a base, a shoe supporting member, and a roll supporting member fastened to the base in such manner that one end of the forward member is open on all sides, while its other end is open on its top and sides.

Another object is to produce an ironer having means whereby it can be disposed of when not in use by its attachment to a vertical surface such as a wall or door.

Yet another object is to provide an ironer having a heated shoe of novel construction.

Other objects and advantages will appear hereinafter.

In the drawings in which are illustrated several exemplifications of my invention:

Fig. 1 is a vertical, longitudinal section taken through the roll of one form of my ironer, and adapted for "over feed" drive;

Figs. 2-5 are transverse sections taken along the lines 2—2, 3—3, 4—4, and 5—5 respectively, in Fig. 1, and looking in the direction of the arrows;

Figs. 6 and 7 are front and side elevations of the completed ironer, employing the roll of Figs. 1-5, and illustrating my improved form of knee control;

Figs. 8 and 9 are respectively, a top plan view, and a side elevation, from the end opposite to that shown in Fig. 7, of the same ironer, but employing my foot control;

Figs. 10 and 11 are respectively fragmentary front and rear views of a modified form of mechanism for swinging the roller in the bearings, towards and away from the shoe;

Figs. 12-14 are respectively front and side elevations and a top plan view of my modified or "under feed" type of roller, in which a novel form of work-table is clearly illustrated;

Fig. 15 is a vertical transverse section taken on the line 15—15 of Fig. 14.

Fig. 16 is a top plan view of the base employed with the ironer of Figs. 12-14, illustrating one type of hanger employed with my ironer.

Figs. 17-19 are respectively a longitudinal section, and rear and front elevations of the supporting bracket for the roller of the ironer shown in Figs. 12-14;

Fig. 20 is a vertical section, on enlarged scale, of the bracket according to Fig. 16;

Fig. 21 is a fragmentary top plan view of the end construction shown in Fig. 2;

Fig. 22 is a vertical section taken on the line 22—22 of Fig. 23;

Fig. 23 is a plan view, partly in horizontal section taken on the line 23—23 of Fig. 22;

Fig. 24 is a vertical section taken on the line 24—24 of Fig. 23;

Fig. 25 is a view in perspective of the cam lever cooperable with the device illustrated in Figs. 22-24 inclusive;

Fig. 26 is an end view from the right end of the device of Fig. 14, with the apron or work table omitted for the sake of clarity;

Fig. 27 is a top plan view of my improved ironing shoe, particularly adapted for use in pressing sleeves or the like;

Fig. 28 is a transverse section through the shoe;

Fig. 29 is an elevation, partly in section, of the left hand end of another exemplification of my invention, illustrating the interior face of the supporting arm, and showing the operation of the knuckle joint; while Fig. 30 is a section on the line 30—30 of Fig. 29 taken in the direction of the arrows.

Referring more particularly to Figs. 1-7, wherein an over feed type of ironer is illustrated, a base 1 (Figs. 2, 6, and 7) is provided on which a roll support 2 is mounted adjacent one corner thereof. This support carries a yoke member 3 having arms 4 and 5, by which the roll, indicated generally by the numeral 6, is carried. It will be noted that the yoke is closely adjacent the longitudinal extent of the roll 6, and that the arms 4 and 5 support the roll in such a manner that the ends of the latter are substantially entirely open, the left-hand end being free on all sides, and the right-hand end being free on its top and side. Spiders 7 and 8, of skeleton form, are located in the roll adjacent to the respective ends thereof and will hereinafter be described in detail.

Also mounted on the base 1, preferably in the corner diagonally opposite from the support 2, is a second support or pedestal 9, on which is carried a shoe 10. It will be noted that the shoe is supported at a point intermediate the ends, preferably at point substantially midway therebetween. It will be further noted that the supports 2 and 9 between them form a U-member, of which the base 1 is the head or yoke, whereby the ends of the ironer are left substantially unobstructed for the passage of large pieces. By having the supports staggered along the length of the base with respect to each other, the overall width of the base is materially diminished.

In either the over feed or under feed type, it is the forward member, relatively to an operator, which is supported substantially at and underneath its end, and the rearward member is supported substantially intermediate its length. By this construction, the desired economy in the material for the base is achieved, while at the same time there is substantially no obstruction to the ready insertion of the material to be ironed over any part of the entire length of the ironer.

As more clearly shown in Figs. 1 and 3-5, the roll 6 comprises a tubular member 11, mounted on and supported adjacent its ends by the hereinbefore mentioned spacers or spiders 7 and 8. The member 11 may be secured thereto as by screws 12, 12 in such manner that the member 11 is fixed to and rotates with the spiders 7 and 8. The spiders are shown as having a plurality of apertures 13, whereby ventilating channels are provided, extending throughout the length of the roll.

Mounted on and closely adhering to the member 11 is a roll padding 14. A single piece of hair felt, jute felt, or the like is placed around the roll in such manner that the edges of the padding meet evenly. The pad is then glued or secured by material such as cement to the surface of the member 11, whereby the material is solidly and securely fixed to the roll. If intermediate coverings are employed, these are in turn secured to the roll surface.

Located substantially centrally through the end portion of the tube 11, for a small portion of its extent are stubshafts 15, 15'. These shafts are preferably adapted for a slight displacement in the arms 4 and 5 as will be hereinafter more fully described. Pivotally secured either directly or indirectly to the arms 4 and 5 in any suitable manner, are crank arms 16 and 17, or links such as 160 and 154 in Fig. 30 which carry the stubshafts 15 and 15', respectively, adjacent their outer ends. By these means, and when properly actuated, the roll 6 can be swung towards and away from the shoe. At the left-hand side of Fig. 1 the eccentric arm 16 is shown with an extension or stud 18 and bearing 19 in arm 4; while at the right-hand end, the eccentric arm 17 has an extension or stud 20, received in a recess 21 arranged in the arm 5.

While the shafts 15 and 15' may be rotated in any desirable manner, and while the roll may be fixed in space, and the shoe may be movable towards and away from the roll, I use the reaction thrusts of the motor, preferably mounted internally of the roll, to move the roll towards and away from the shoe, which latter in the preferred instance, is fixed on the base. Referring more particularly to Figs. 1-5 inclusive, it will be seen that a tube or cylinder 22 is provided. Arranged interiorly of the tube are three partition plates, 23, 24 and 25. The plate 23 holds the rear bearing of the motor 26; the plate 24 separates the motor chamber from the gear box, which preferably is filled with lubricant, and also holds the forward motor bearing and contains sockets for the gear bearings; while the plate 25 holds the remainder of the gear bearings. The stubshaft 15' is fixed in plate 24, and extends through plate 25.

In my preferred construction an economy of 30% or more in the cost of the motor is obtained over prior constructions; approximately three and a half (3½) to five (5) pounds is saved in the gross weight; an almost self-aligning construction is obtained, a tube always being straight and true; and a construction is produced which is very difficult to get out of line. Further, no machining is required with the tubular construction since its interior and ends are trued as soon as the partition 24 is forced to the center, the surface of the tube being smooth. A still further advantage of the foregoing construction is that direct ventilation is provided throughout the length of the roll, through the openings 13 in the spiders 7 and 8.

In order to insure proper ventilation of the motor 26, a fan 146 is mounted on the shaft 147 thereof. A baffle plate 23', having an opening 148, is mounted within the tubular member 22, and rearwardly of an opening 149 therein. By this construction, air is sucked in by the fan, in the direction of the arrows, from the interior of the roll 11, through the openings 149, and 148, through the motor 26, and outwardly through the spacer 23. The fan 146, by increasing the incoming quantity of air, improves the ventilation of the roll as a whole as well as that of the motor.

Current is supplied to the motor 26 by means of leads 27 and 28 passing through a conduit 29 (see Figs. 6, 7 and 8), through the hollow center 30 of stubshaft 15', to the line. When the motor is actuated, the roll 6 is held or retarded and the clutch parts 50 are engaged with the teeth 48 on the clutch disc 47, and the thrust of the motor's rotational effort is transferred to the stubshafts 15 and 15', by reason of the rotation of the tube 22 and its parts relative to the fixed sockets 32 and 33 in the partition plates 23 and 24, respectively, so that the eccentric arms 16 and 17, when properly actuated, will swing the stubshafts 15 and 15' towards the shoe. As shown in Fig. 1 the slot in the arm 4 and in which the shaft 15 rides is concealed from view, while that in the arm 5, for the shaft 15', can be arranged either visible or invisible from the exterior, at the option of the manufacturer. This slot is here shown at 34 in Fig. 7. Rotation in the counter-clockwise direction of the motor and consequent rotation of the clutch 47 in the opposite direction causes the rotation of the roll 6 in the same direction as the clutch 47.

When energized, the motor shaft 147 rotates, carrying with it the driving pinion 35 which in turn meshes with a gear 36 fixed to a shaft 37, mounted at 38 and 39 in suitable bearings in the partitions 24 and 25 respectively. Through a pinion 40 fixed on the gear 36, the modified rotatation of the motor is transmitted to the gear 41, carried on the shaft 42 (Fig. 5), which is also journaled or otherwise mounted in the partition plates 24, 25. A pinion 43 is secured to the shaft 42 and in turn drives the spur gear 44. This gear translates the rotative force of the motor 26, at reduced speed to the sleeve 45, fitting loosely about the shaft 15', and spaced by bushings 46, 46, and which sleeve carries at its other end a clutch plate 47 having a plurality of ratchet teeth 48. At such times as the clutch plate 47 is disengaged from its cooperating clutch members, the motor rotates without affecting or actuating the roll.

Suitable means are provided for cooperation with the clutch member, and while these may take any desired form, they preferably comprise elongated bearings 49, 49 in the spacer 8, through which bearings the pawl-arms 50, 51 are journaled. A cross member 52 preferably interconnects the pawl-arms at their outer extremities, and in its present exemplification is shown as having an annular flange 53, on its inner face. This flange is adapted to cooperate with a corresponding outwardly extending hub 54 on the outer face of the spacer 8; and the two elements retain between them a spring 55, preferably helical, which tends to maintain the cooperating clutch elements in their disengaged positions.

It is essential that the roll 6 be prevented or retarded from rotating during such time as it is being moved from its normal position of rest into engagement with the shoe 10, in order that the rotative force of the motor 26 may be utilized to effect the bodily displacement of the roll. To this end, the spacer plate 8 is preferably provided with a plurality of radial teeth 56, and these are shown in Figs. 1 and 3 as being arranged about the periphery thereof. Cooperating with the teeth 56 is a suitable pawl or cam member 57, shown in Figs. 1, 2 and 21 as being secured in any suitable manner as by rivets or the like 58 to a pawl-plate 59. This latter is shown as terminated at its outer ends in bearing-sleeves 61, 61. These sleeves are fitted about a cam shaft 62 which will be hereinafter more fully described. The pawl-plate is adapted for rocking motion about the shaft 62 as an axis, and carries with it at such times the pawl and cam member 57.

In the normal action of the device, the switch 31, of Figs. 6 and 7 is properly actuated to effect heating of the shoe and the rotation of the motor is initiated whenever the device is connected to the electrical outlet. A cam 64 on the cam shaft 62, both of which members will be more fully described hereinafter, is operated in order to engage the ratchet teeth 48 on the clutch plate 47 by means of the pawls 50 and 51. The motor 26 is then interlocked with the roll 6, by the engagement of the cam or pawl 57 with the cooperating teeth 56, whereby the arms 16 and 17 are rotated in their bearings, to bring the roll into contact with the shoe.

As shown in the present instance, suitable means such as a coiled spring 65 is employed to cause the normal interengagement of the elements 56 and 57. The member 17 carries a cam arm 68, so that during the rotation of the portion 67 of the eccentric 17, the cam arm 68 is rotated therewith. As a result of such rotation, the latter engages underneath an outwardly inclined projection 69 of the cam or pawl 57. Continuation of the movement of the portion 67 of the eccentric 17 causes the cam arm 68 to ride still further along the under surface of the projection 69. This causes the pawl-plate 59 to rock about its bearing 61, 61 and to release the cam 57 from its engagement with the teeth 56. By this action the roll is released and is free to rotate in its bearing against the face of the shoe 10. It will be readily understood that the time factors of the several elements are so correlated that the roll 6 will be released for rotation approximately at the moment when it comes into operating position adjacent the shoe.

Referring now more particularly to the construction of the cam 64, it will be seen that the cam is carried on the shaft 62, which latter is journaled in bearings 70 and 71, shown as projecting inwardly from the arm 5. Rotation of the cam 64, fixed to the shaft 62, causes movement of the pressure plate 72, carrying with it the cross member 52 and pawls 50 and 51, against the reaction thrust of the spring 55.

Means for actuating the cam shaft 62 includes a collar 73 on the shaft 62 having an extension lug 74 thereon. In the end of the lug 74, a connecting rod 75 is secured in any suitable manner, as by insertion through an eye of the lug, the connecting rod being retained in place by means of the cotter pin 76. The connecting rod 75 extends from the end of the roll down into the interior of roll support 2, through an opening 77 arranged therein, where it engages in any suitable manner a cranked projection 78 on a sleeve 79 journaled in any suitable manner in the interior of roll support 2 as by means of suitable bearings 80. The hollow interior of the sleeve 79 is preferably for at least a portion of its extent, of polygonal form as at 83 whereby it is adapted to receive an actuating lever 81. This construction is more fully illustrated in Figs. 2, and 6-9 inclusive. In Figs. 6-7 the lever 81 is shown as ending in an enlarged portion 82 suitably arranged for actuation by the knee of the operator. Should the ironer be placed on a table, the operator sitting adjacent thereto on a chair or stool, it is necessary merely that he turn on the switch 31 by manual operation, after which the movement of the cam 64 in Fig. 1 can be controlled entirely by sidewise movement of the knee against the member 82. In this manner the operator's hands are left substantially entirely free for the operations necessary to control the material-to-be-pressed in its passage through the ironer.

The machine is adaptable not only for use with a knee actuated means such as 82, but because of the polygonal socket 83, previously referred to, as illustrated in Fig. 2, the shaft 81 may be withdrawn and a suitable link 81' be inserted in its stead. A connecting link variable in length to suit tables of varying height operably associates the link 81' with a foot treadle 85, which is shown as having a pivot point 86 of any suitable form, so that movement of the foot by an operator standing adjacent the machine may be translated to the roll 6 of the ironer to cause the proper actuation thereof. If desired a chain 84 may be inserted in lieu of the link above referred to, which chain is adapted for insertion through an eye 85' in the foot treadle 85, after which it may be connected back on itself in any adjusted position by a hook member 84', terminating the free end of the chain, and engaging with a desired one of the links thereof. By this arrangement, the connecting means may be varied in length in order to properly locate the foot mechanism in operable position, regardless of the height from the floor of the table surface on which the ironer is placed.

Referring to Fig. 16 it may be noted that the base 1 has a portion 87 substantially right-angular in form. At 88 the support or pedestal 121 (see Fig. 12) for the shoe 10 is mounted, while at 89 place is made for the corresponding support or pedestal 2' of the roll 6 in the case of the under feed type of ironer, while in the case of the over feed ironer the support for the roll 2 is mounted at 88. In this last-mentioned instance place is made at 89 for the corresponding support 9 for the over feed shoe 10. In this connection compare Figs. 6 and 7 with Figs. 12 and 13. It is the portion 89 with which we are now particularly interested. As shown, lugs 90, 90 are provided in the form of bearings, and journaled therein by suitable means such as a pin 91 (see Fig. 22) is the support or pedestal 2'. This construction permits of a slight pivotal movement of the roll towards and away from the shoe, by a suitable means as hereinafter described. In the present construction such means comprise a threaded lug 92 in which is threaded a fillister-head bolt 93 (see Fig. 22). This bolt extends loosely through a hub 94 of a portion 95 of the bed of the base member, which latter carries cam surfaces 96 on its underside. Also carried on the bolt 93, between the underside of the portion 95 and the head of the bolt, is the end portion 97 of a cam lever 98. This cam lever is more clearly illustrated in Fig. 25 and is shown as having an inclined cam surface 99 adapted for cooperation with the cam surface 96 of the member 95. The lever 98 has an upwardly extending portion 100 which extends outwardly to the exterior through a slot 101 provided in the base 1. A handle portion 102 permits manual actuation of the cam member in such manner that the distance between the hub 94 and the member 92 may be diminished against the tension of a helical spring 103, thus causing movement of the roll about its axis 91 away from the shoe 10. Manual adjustment of the bolt 93 in member 92 permits the distance between the shoe and the roll to be adjusted to compensate for any "packing" of the padding on the surface of the roll, so that adequate pressure between the cooperable parts will always be maintained. At the same time the pivotal arrangement of the roll allows it to compensate for any variations in the thickness of the material to be ironed. The use of the lever 98 permits the roll to be removed from the shoe in order to prevent scorching of the surfaces of the several parts, especially while the machine is cooling after the ironing period is past.

While the constructions of the base 1, as illustrated in Fig. 16, has been described with particular reference to the under feed construction of Figs. 22–25, it is obvious that the base may quite as readily be employed with the over feed type of ironer. In that case the pedestal 2 for the roll is mounted at 88, while the pedestal 9 for the shoe is mounted at 89 and is adjustable relative to the roll, in substantially the same manner as previously described with reference to the adjustment of the roll to the shoe.

A feature of my construction, both with the under feed and over feed type of ironer, is the great amount of clearance between the lowermost element of the cooperating members (the shoe in the case of the under feed ironer, and the roll in the case of the over feed type) and the top surface of the base. To this end the base 1 is cut away and is preferably sloped downwardly wherever possible, as at 150 (Figs. 15 and 16), thus permitting great facility in handling the garments.

A modified form of the arrangement whereby the roll is moved bodily under the actuation of the motor towards and away from the shoe, is illustrated in Figs. 10 and 11 in which Fig. 10 is a view from the exterior of the modified construction, while Fig. 11 is a view of the interior surface thereof. In the end plate 104 shown therein, an angularly arranged, straight slot 105 is formed. The shaft 15'' is adapted for movement in the slot, the said shaft being the equivalent of the shaft 15' of Fig. 1. Mounted about a portion (approximately 180°) of the surface of the shaft 15'' are a plurality of gear teeth 106 adapted to mesh with a cooperating rack 107 secured in any suitable manner to the interior surface of the arm 104. Bearings 108 and 109 are struck up from the interior surface of the arm 104, and carried in the bearing 108 is a stub 110 on which one bearing 61' of the pawl-plate 59' is mounted. The other two bearings 61', 61' of the pawl-plate are mounted on a suitable shaft 111 carried in the lug or bearing 109. The collar 73 with its projecting lug 74 is the equivalent of the corresponding elements illustrated in Figs. 2 and 21, as is the cam 64. A coiled spring 65 is provided for retaining the pawl-plate 59' with its cam or pawl 57'' in engagement with the cooperating teeth 56, while the opposite extremity of the cam 57'' is shown as terminating in an outwardly extending portion 69' adapted to be engaged by the eccentric strap 112, fixed in any suitable manner to the shaft 15''. Movement of the roll relative to the eccentric strap, as a result of the interlocking of the teeth 56 and the cam 57', will cause engagement of the underside of the projection 59' with the eccentric 112, whereby the pawl-plate 59 will be swung about its bearings 61' to disengage the roll-locking means. It is believed that this construction will be obvious, when considered with the description of the preferred form of my invention.

Still another exemplification of that portion of my invention pertaining to moving one or the other of the roll and the shoe relative to the other is disclosed in Figs. 29 and 30, wherein the arrangement of parts for the left-hand end of the ironer is illustrated. At 151 in these figures is shown a roll supporting arm corresponding to the arm 4 of Figs. 1 and 6 and the arm 120 of Fig. 12. On the interior face of the arm 151 a guide way is provided by means of guides or tracks 152 and 153. The track 153 extends substantially entirely across the arm, while the track 152 extends over only approximately half of the width, for a purpose to be more fully described hereinafter. The knuckle joint which rides in the rails, and which forms an essential feature of the exemplification comprises, in the preferred form, an eccentric 154 having an offset head portion 155 at one end in the form of a split nut, adapted to be clamped around the stubshaft 15 of the roll by means such as bolts or the like 156. The other end of the eccentric preferably terminates in a head 157 having an eye therethrough.

A pin 158 is illustrated as extending through the eye; and embracing the pin, one on each side of the head 157, are the forked arms 159, 159 of a rocker 160. The rocker arm 160 likewise terminates in a head 161, substantially similar to head 157, and which is pivotally mounted, by means of an eye, about a bearing pin 162 journalled in a recess 163 in the arm 151. It of course will be understood that the split nut head portion 155 is arranged about the stubshaft 15 in such a manner as to lock or fix the shaft 15, preventing rotation therein.

In operation, when the roll is locked against rotation, the relative movement of the roll and the motor causes the stubshaft 15 to tend to move in the guides 152 and 153. Being restrained by such guides into a substantially rectilinear path, the shaft 15 pulls the eccentric 154 and the rocker arm 160 from their buckled position as shown in dotted lines in Fig. 29, which position is permitted by the termination of the rail 152 substantially at the mid point of the arm 151, and in which position the roll is shown in the right-hand dotted circle 6 as being removed from the shoe, into the fully extended position, shown in full lines in Fig. 29, and in Fig. 30. When the eccentric and the rocker arm are in their extended position, the roll assumes the position shown in the left-hand dot and dash circle of Fig. 29, and positively abuts the shoe of the ironer.

My invention includes also means for hanging the ironer out of the way at such times when it is not in use. Any suitable means may be employed to this end, but experience has shown that the simplest construction is to arrange an aperture 113 in the base member 1, adjacent the periphery thereof (see Fig. 16). A specially designed wall-bracket 114 (see Fig. 20) is adapted to cooperate therewith, and this latter may be secured to the wall in any suitable manner as by screws 115. As better shown in Fig. 20, this wall bracket has a substantially right-angular extension 116, terminating in a knob 117, which latter prevents the ironer after the base member has been seated thereon, from being accidentally disengaged from the bracket, as a result of shock, or the like. It will of course be understood that the aperture 113 is so placed, and the ironer 1 is so hung thereon, that the center of gravity of the complete device will be below the aperture, thus stabilizing its equilibrium position on the hook.

A modified form of my invention is illustrated in Figs. 12 through 19 inclusive and 26, wherein an under feed type of roller is employed. In this device, the arrangement is much similar to that of the over feed type except that on the roll supporting pedestal 2', a tubular shaft 118 is fixed, and at the extremities of this shaft arms 119 and 120 are fixedly mounted, each of these arms acting as a support for the roll 6. In this constructional form the pedestal 2' is arranged substantially midway along the shaft 118 in the rear left corner of the base 1, while the pedestal 121 for the shoe is arranged at the extremity of the shoe in the forward right-hand corner of the base 1.

The provision of a support for the shoe at and under one end thereof has the following advantages. First, it is possible to use substantially all of the length of the shoe for ironing sleeves or other tubular fabrics, instead of only half the length of the shoe as would be the case if the shoe were supported at its midpoint. Second, where a flat fabric wider than the shoe has been ironed by passing between the roll and the shoe and it is desired to remove it from the base toward the operator, a much greater width of the fabric is unobstructed by the shoe support, so that it is much easier for the operator to remove them for further operation thereon.

It may be pointed out that the same mechanism is employed for actuating the under feed type of ironer as is utilized with respect to the over feed type, the only difference residing in the reversal of the direction of the rotation by the roll, by simple reversal of the motor, and in the structural features to be hereinafter described.

As shown in Figures 18 and 19, the arm 119 carries brackets 122 and 123 in which is mounted a shaft 124. On this shaft is carried by suitable means such as bearings 125 and 126, a modified form of pawl-plate 127. On its underface, as shown in Figs. 17 and 18, this pawl-plate carries a cam lug 128, adapted to cooperate with the teeth 56 shown in Fig. 13. On its exterior face, as perhaps best illustrated in Fig. 19, the pawl-plate 127 carries a projection 129 having a reverse bend therein for the reception of an eccentric 130. The eccentric is shown as having an aperture 131 for the reception of the shaft 15' of the roll.

A spring 132 on the shaft 124 between members 122 and 125 forms a resilient connection between the turning shaft 124 and pawl-plate 127. A connecting rod 133 is pivotally connected between both member 74 and a bell crank 134, which latter is pivotally mounted at the lower end of arm 119 (see Figs. 18 and 19). A connecting rod 135 extends between member 134 and a crank arm 136 pivotally mounted on base 1 (see Fig. 13), which latter has a square opening to receive a correspondingly shaped rod 137 of a knee control lever 138 (see Figs. 12 and 13). A return or torsion spring 139 is located between members 130 and 119 and has its respective ends anchored thereto. Eccentric arm 130 has rigidly secured thereto one end of a stub shaft 140, whose other end has a turning movement in a sleeve 141 fixed in arm 119 (see Fig. 17).

A work board 142 is provided, at each end thereof, with resilient hooks 143 whose outer ends fit into suitable sockets on the shoe, so that the board 142 may be easily and quickly mounted on and removed from the shoe without requiring any tools to effect such mounting or demounting. Braces 144 have one end secured to the bottom of the work board and have a portion extending along the back of the shoe, the end of each brace engaging the back of the shoe. Thus the external surface of the shoe is substantially smooth, and the lateral dimensions are such as to permit of easily and quickly locating a sleeve thereon to iron the same, the longitudinal lines of the shoe being smooth and what may be called "stream lines".

Since the ironing of many types of garments I have found that the use of the work table is unnecessary and in some instances undesirable, I have intentionally designed the work board to be of an easily detachable type, the supports of which will in no way interfere with the "openness" of the shoe.

Means for carrying the ironer are shown as comprising a handle 145, preferably arranged on the arm 120, and this handle and arm are best illustrated in their cooperable position in Figures 14 and 26. The construction is such that the arm 119 will permit of the ironer being raised on its end, in which position the handle 145 may be readily seized for transporting the same. It is obvious that at such times the work board 142, which is adapted to aid in the insertion of the material into the iron, is removed.

A still further feature of my invention is illustrated in Fig. 27 wherein the ironing shoe 10 is shown as having bolt holes 164 whereby it may be attached to the supporting pedestal. In order to facilitate insertion of the shoe into the sleeve of a garment to be pressed, or the location of the sleeve about the shoe, as the case may be, the shoe is illustrated as terminating in a rounded end 165 of relatively large radius or radii of curvature, together with a slightly rounded end portion 166 as indicated by the dotted lines in Fig. 27.

Yet another feature of my invention is distinctly set forth in Fig. 28, wherein is illustrated a cross section of the shoe according to my invention.

As fully set forth in other parts of the specification, it is a very distinct purpose of my invention to reduce the total weight of the ironer to a minimum. As is well known, however, it is essential that the shoe be of sufficient mass that it will act in a sense as a reservoir of heat, the flow of which to the garments to be pressed is retarded or regulated so that should a large wet garment be placed on the shoe, the effective temperature of the shoe's surface would not be unduly diminished. In order to prevent these two essential features from being inconsistent, as would at first glance appear to be the case, I use the construction illustrated in Fig. 28. A central core 167, formed of material of high specific heat, yet light in weight, such for instance, as aluminum, is shown as having rearwardly extending bolt receiving projections or lugs 168, 168. Disposed closely adjacent to the core member, and immediately to the rear thereof is shown any conventional type of heating element 169 adapted to supply the necessary heat to the core, which latter member as will be more fully described hereinafter, acts as the heat reservoir. In order to properly seal as much as possible the rear of the shoe against the loss of heat, a covering of heat insulating material is provided in the form of sheet asbestos 170, although an air space of minute width is also effective. The front face of the core 167 is preferably recessed as at 171, and this recess in the preferred form is filled with suitable heat insulating material such as asbestos wool or the like 172. This last-mentioned means serves the function of retarding to a certain extent the emission or conduction of heat from the core member, the emission, as a consequence, depending mainly on radiation. A thin face plate of sheet steel is illustrated at 173 as fitting snugly against the shoe and serving as the surface against which the garment to be ironed rests during the ironing process. This member 173, while referred to as preferably being comprised of stainless steel, may of course be made of any other suitable metal and in the present instance is shown as fitting around the longitudinal ends of the shoe and securing the asbestos sheet to it by means of wing portions 174, 174. It has been found in practice that when the shoe or iron is made thin and is formed of a solid metal, it is very difficult to regulate the heat in such manner as to minimize the danger of scorching the clothes. However, by my invention the possibility of scorching is greatly diminished, and almost entirely eliminated. This is accomplished by using two metal pieces, one for the core and one for the face, and properly insulating the two members. This may be accomplished by any suitable means such as an air space necessarily incidental to light contact between the metal pieces, or by the use of known insulating materials.

As pointed out before, in an ironer for use on tables of varying height it is important to obtain a sufficient amount of clearance between the underside of the shoe on the under feed type or the roll on the over feed type, and the base of the machine, to permit the ready removal of the clothes therefrom, in order to prevent mussing of the garments, and to eliminate the possibility of burning the hand of the operator. The means for accomplishing this have been described in detail previously in the specification. However the shortness of base 1, as seen in Figs. 6 and 12, should not be ignored, inasmuch as it is an important factor.

The base piece extends horizontally through the plane of the center of gravity of the assembly but extends only far enough to steady the machine. By stopping at such point, it provides an extra inch or so of space right at the point where the clothes are withdrawn by the left hand of the operator.

To permit ironing without fatigue to the operator when a portable type of ironer is employed, it is essential to lower the said board as much as possible. This can best be accomplished by conserving the space between the shoe and the base.

When the roll moves toward the shoe it will engage the latter at an edge distant from that edge near which the roll will engage the shoe when ironing. Thus in Fig. 13 the roll will initially engage the shoe 10 at its lower edge and will then move upwardly thereon to a position shown clearly in Fig. 26 where the roll engages the shoe adjacent to the upper edge of the latter. The roll rotates in a direction so that the frictional forces between the roll and the shoe tend to move the roll into its final position, that is, the position occupied by the roll relatively to the shoe during ironing. It is to be noted also that after the roll has engaged the shoe following its approach thereto, the resultant of the frictional forces due to the revolving of the roll under pressure against the shoe, will tend to advance the roll into greater pressure contact. It has been previously proposed to move the ironer towards the shoe by swingably moving the roll and its supporting arms relative to the shoe about a pivot external to the roll and on the side thereof opposite to the shoe. This construction however is not of such nature that advantage can be taken of the frictional forces of rotation.

It is believed that the operation of the device has been fully developed from the foregoing. To summarize, the main features of novelty of my invention are resident in:

1. The combination foot and knee control;
2. The motor and gear housing;
3. The general arrangement, whereby the roll is open at both ends;
4. A means whereby the ironer may be hung up out of the way when not in use;
5. The method of padding the roll;
6. The novel form of detachable table for the under feed type of roll;
7. The mechanism whereby the roll may be adjusted relative to the shoe;
8. The design of the base;
9. The novel form of the shoe, rounded at at least one end and forming a sleeve board;
10. The design and construction of the shoe, and
11. The means for and method of increasing the pressure between the roll and the shoe as a result of the rotation of the roll while contacting against the shoe.

The basic concept of the invention having been disclosed, it is obvious that it will be subject to numerous modifications and adaptations by those skilled in the art, and consequently it is intended that the invention be limited only by the scope of the accompanying claims.

I claim:

1. In an ironer, a roll having a shaft on which the roll is rotatably mounted, a power means mounted on said shaft and operably connected with said roll to revolve the same, means to retard the rotation of the roll, supporting arms for the roll, a knuckle joint structure fixed to each end of said shaft and pivoted in said supporting arms to press the roll against the shoe at such times as the roll is retarded against rotation.

2. In an ironing machine, a substantially fixed shoe, a revolvable roll, a shaft means passing through the said roll and on which the roll is adapted to revolve, substantially fixed supporting members supporting the roll, and toggle means fixed to each end of said shaft means and cooperating with said supporting members to effect bodily movement of the roll towards and away from the shoe.

3. In an ironer, a roll and shoe relatively movable with respect to each other, a shaft on which the roll is revolvably mounted and supported, supporting arms for said shaft, a set of tracks attached to the interior face of each of said arms, and pivotally interconnected eccentric arms and rocker arms forming knuckle joints and movable one along each of said set of tracks in a substantially rectilinear direction, one member of each knuckle joint being fixedly connected to the shaft, while the other member is rotatably mounted in the supporting arms and power means operably associated with said shaft.

4. In an ironer, a rotatable roll having a shaft on which the roll is rotatably mounted, a power means mounted on the shaft and operatively connected with said roll, a support in which said roll is mounted by means of its shaft for limited bodily movement, and knuckle-joint means, one arm of which is pivotally mounted on the interior of said support and the other arm of which is fixed on said shaft.

5. An ironing machine including a fixed shoe, a rotatable roll, a pair of shafts in the roll rotatably supporting the same, fixed supporting members, a pair of swinging arms one at each end of the roll having one portion fixedly pivotally supported in the respective supporting members and engaging and supporting the respective shafts at another portion thereof, an electric motor in the roll and mechanism in the roll driven by the motor to cause a movement of the swinging arms and the roll to effect engagement of the roll with the shoe and then to rotate the roll against the shoe.

6. An ironing machine including a fixed shoe, a rotatable roll, a pair of shafts in the roll supporting the same, a pair of fixed supporting members, a pair of swinging arms one at each end of the roll pivotally supported by the respective fixed supporting members and engaging the respective shafts to support the roll and motor driven mechanism located in the roll and cooperating with the swinging arms to cause movement of the roll into engagement with the shoe and then to rotate the roll against the shoe.

7. An ironing machine including a fixed shoe, a rotatable roll, shafts on the roll at each end thereof supporting the same, a pair of swinging arms one at each end of the roll engaging the shafts to pivotally support them and the roll, a motor within the roll including a stator and a rotor, means for actuating the swinging arms to move the roll into engagement with the shoe, a connection between the motor and the actuating means utilizing reaction between the rotor and the stator for operating said actuating means and a retarding means opposing rotation of the roll when separated from the shoe.

8. An ironing machine including a support, a fixed shoe thereon, a rotatable roll, shafts in the roll at each end thereof supporting the same, means anchored to the support, said means being at each end of the roll and having an end secured to the respective shafts and operated by rotation thereof to move the shafts toward and away from the shoe, a motor within the roll and connected between the roll and the shafts to exert a driving force to rotate the roll to turn the shafts in a direction causing approach of the shafts and the roll toward the shoe and means for impeding rotation of the roll when disengaged from the shoe.

9. An ironer comprised of a shoe adapted to be heated, a roll, one or the other of the shoe and roll being mounted in advance of the other, and a yoke fitting closely to the roll and supporting the same at both ends, the rearward member being supported substantially from its center, and the forward member being supported substantially underneath one end.

10. An ironer comprising a shoe member and a roll member, a substantially rectangular base, a support mounted on one corner of said base, one member being mounted substantially at one of its ends, from its underside, on the said support, and the other member being supported intermediate its ends, on a second support mounted at a point on the base diagonally opposite from the said first-mentioned support.

11. In an ironer, a heated shoe having a cross section sufficiently small to permit substantially all of its length to be inserted into a sleeve of an ordinary garment, means for supporting the shoe at only one end thereof, means to revolve a sleeve around said shoe to iron the periphery thereof including a revolving cylinder disposed parallel to the shoe and revolving thereagainst, power means operably associated with the cylinder, and means including the said power means to mechanically move the roll and the shoe apart and together.

12. In an ironer, a heated shoe having a cross section sufficiently small to permit it to be inserted into a sleeve or a small tubular portion of an ordinary garment, means for supporting the shoe offset from the center thereof to permit the insertion of the majority of the length of the shoe into said portions of a garment, and means to revolve said sleeve or tubular portion around said shoe to iron the periphery thereof including a revolving cylinder disposed parallel to the shoe and revolving thereagainst, power means operably associated with said cylinder and means including said power means to move the cylinder and the shoe apart and together.

13. In an ironer, a substantially fixed heated elongated shoe having one end rounded and having a cross-section sufficiently small to permit it to be inserted into the sleeve of an ordinary garment, means supporting said shoe at its other end, a rotatable roll having its axis substantially parallel to the longitudinal axis of the shoe and means for effecting movement of the roll towards and away from the shoe.

14. In an ironer including a rotatable roll and an elongated shoe one of which is movable toward and away from the other, the longitudinal axes of the roll and of the shoe extending substantially parallel to each other, means directly secured to the under side of the shoe at only one end thereof for supporting the same.

15. An ironer having a roll, a heated shoe having a thick core of metal forming a heat reservoir and having a recess therein at the back, an extended heating element located in the recess in said core, a heat insulating covering for the heating element, and a thin face plate at the front of the core conforming substantially to the curvature of the core, the face plate being formed of a metal or metals adapted to receive a polished surface and being relatively more resistant to corrosion or rust than the core material.

16. In an ironer having a roll, a heated shoe, the said shoe having a thick core recessed at the back thereof and serving as a heat reservoir, an extended heating element located in the recess in said core, a heat insulating backing for the outside surface of the heating element, and means for regulating the flow of heat to the roll comprising a thin face plate substantially conforming to the curvature of the roll and spaced from the core at its central portion.

17. In a portable ironer, a base having a cam surface therein, a fixed shoe, a roll, a roll support pivotally mounted on said base and adapted for rotation through a vertical angle, the said rotatable roll being bodily movable with respect to said base, a cam mounted in cooperation with said cam surface, a lug in said roll support above said cam surface, a bolt passing through said cam and cam surface and extending into said lug, and a spring about said bolt between the lug and said cam surface, normally maintaining those elements separated, the actuation of the bolt adjusting the distance between the roll and shoe.

WILLIAM M. EMERY. [L. S.]